United States Patent
Granbery

(10) Patent No.: US 8,583,933 B2
(45) Date of Patent: Nov. 12, 2013

(54) AUTHENTICATED CHECKIN VIA PASSIVE NFC

(75) Inventor: John Hastings Granbery, New York, NY (US)

(73) Assignee: eBay Inc., San Jose, CA (US)

(*) Notice: Subject to any disclaimer, the term of this patent is extended or adjusted under 35 U.S.C. 154(b) by 25 days.

(21) Appl. No.: 13/336,696

(22) Filed: Dec. 23, 2011

(65) Prior Publication Data

US 2013/0166917 A1 Jun. 27, 2013

(51) Int. Cl.
*H04L 29/06* (2006.01)
(52) U.S. Cl.
USPC .................. 713/179; 726/32; 705/5
(58) Field of Classification Search
USPC .................. 713/179; 726/32; 705/5
See application file for complete search history.

(56) References Cited

U.S. PATENT DOCUMENTS

| 6,868,406 B1* | 3/2005 | Ogg et al. ............... 705/60 |
| 2005/0144437 A1* | 6/2005 | Ransom et al. ............ 713/151 |
| 2005/0177734 A1* | 8/2005 | Tanimoto et al. ........... 713/186 |
| 2012/0240150 A1* | 9/2012 | Low et al. ................ 725/32 |

OTHER PUBLICATIONS

Carbunar, Bogdan et al., "You Unlocked the Mt. Everest Badge on Foursquare! Countering Location Fraud in GeoSocial Networks", 9th IEEE International Conference on Mobile Ad hoc and Sensor Systems (MASS), Las Vegas, Oct. 2012, pp. 1-10.*

* cited by examiner

*Primary Examiner* — Michael Pyzocha
(74) *Attorney, Agent, or Firm* — Haynes and Boone LLP

(57) ABSTRACT

The present disclosure involves a method of verifying user check-ins to a venue. The method includes initializing a digital check-in chain for a venue. The method includes expanding, electronically by a processor, the check-in chain with a plurality of check-in entries that each correspond to a visit to the venue by a respective user. Each check-in entry on the check-in chain is generated in response to one or more preceding check-in entries on the check-in chain. The method includes detecting fraudulent check-in entries in response to a split in the check-in chain. The method includes removing the fraudulent check-in entries from the check-in chain.

26 Claims, 5 Drawing Sheets

AUTHENTICATED CHECKIN VIA PASSIVE NFC

BACKGROUND

1. Technical Field

The present disclosure generally relates to enhancing security with transactions and, more particularly, to authenticating an NFC-enabled check-in.

2. Related Art

Check-ins in a social media context have become popular in recent years. These services allow a user who is visiting a particular venue (e.g., a store or a restaurant) to announce on social media that he has "checked in" at that venue. Users who frequently check into a specific venue may earn points or titles such as "mayors" of such venue. These users may also receive rewards from the venues that they frequently check into so that they are encouraged to perform more check-ins in the future, thereby raising the venue's popularity. However, traditional check-in mechanisms may lack sufficient fraud prevention, thereby allowing scheming users to "check in" to a venue without physically being there. These types of fraud undermine the credibility of check-in systems and as such may hurt its future growth.

Therefore, while existing check-in mechanisms have been generally adequate for their intended purposes, they have not been entirely satisfactory in every aspect. It would be advantageous to add additional levels of security to check-in mechanisms so that fraudulent check-ins may be quickly discovered and addressed.

SUMMARY

One of the broader forms of the present disclosure involves a method. The method involves: initializing a digital check-in chain for a venue; expanding, electronically by a processor, the check-in chain with a plurality of check-in entries that each correspond to a visit to the venue by a respective user, wherein each check-in entry on the check-in chain is generated in response to one or more preceding check-in entries on the check-in chain; detecting fraudulent check-in entries in response to a split in the check-in chain; and removing the fraudulent check-in entries from the check-in chain.

Another one of the broader forms of the present disclosure involves an apparatus comprising a non-transitory, tangible computer readable storage medium storing a computer program. The computer program has instructions that when executed, perform: initializing a digital check-in chain for a venue; expanding, electronically by a processor, the check-in chain with a plurality of check-in entries that each correspond to a visit to the venue by a respective user, wherein each check-in entry on the check-in chain is generated in response to one or more preceding check-in entries on the check-in chain; detecting fraudulent check-in entries in response to a split in the check-in chain; and removing the fraudulent check-in entries from the check-in chain.

Yet another one of the broader forms of the present disclosure involves a method. The method involves: providing a check-in seed for a venue; receiving a first check-in entry, the first check-in entry being a function of the check-in seed; verifying, electronically by a processor, the first check-in entry; forming a check-in chain by appending the first check-in entry after the check-in seed if the first check-in entry is successfully verified; receiving a second check-in entry, the second check-in entry being a function of the check-in seed and the first check-in entry; verifying, electronically by the processor, the second check-in entry; and expanding the check-in chain by appending the second check-in entry after the first check-in entry if the second check-in entry is successfully verified.

DETAILED DESCRIPTION

Figure 1:
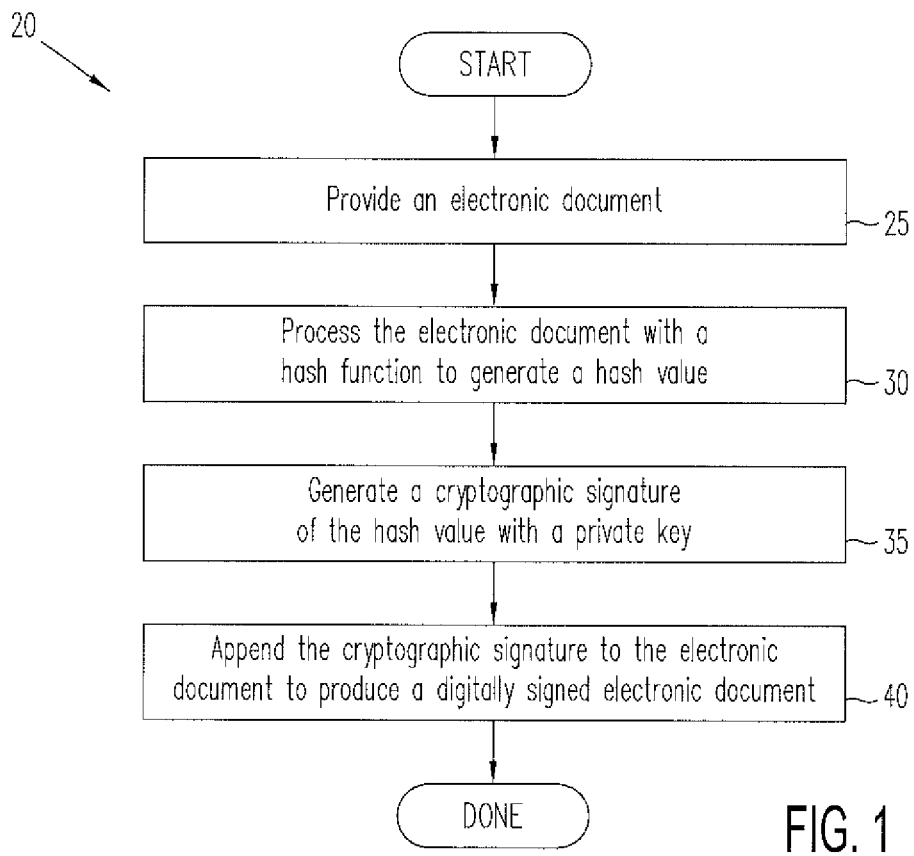
FIGS. 1-2 illustrate example flowcharts for performing cryptography according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As social media continues to evolve, various services based on social media have gained popularity in recent years. One of these services is the "check-in" service offered by companies such as FOURSQUARE®. While the details may vary, the general concept behind check-ins usually involves the following: a user arrives at a specific venue, for example a merchant's store; the user announces—often through a social networking service such as TWITTER® or FACEBOOK®—that he has checked into the merchant's store; the merchant may keep track of the number of check-ins for each user and may reward the user with a prize (e.g., a free pizza or a discounted hotel stay) once the user reaches a certain number of check-ins.

Traditionally, a mechanism to verify the user's check-in at a particular location is through Global Positioning System (GPS). For example, a user who carries a GPS-enabled communications device such as a smart-phone or a computer tablet may have his physical coordinates verified by way of the GPS signals sent through his phone or tablet. However, GPS verification may be time consuming and may not be reliable if the user is indoors, which is often the case if the check-in location is a store or a restaurant.

To overcome the issues related to GPS-enabled check-ins, Near Field Communication (NFC) enabled check-ins have been implemented to replace GPS-enabled check-ins. For example, a merchant may install an NFC tag device inside its facility (for example, near the entrance of the facility). As users come inside the merchant's facility, they can "tag" the NFC tag device inside the facility by bringing their NFC-enabled communications devices in close proximity with the NFC tag device. This type of NFC tagging allows the users to be "checked in" to the merchant's facility.

However, existing systems and methods of NFC tagging may lack sufficient fraud prevention. As an example, a user intending to commit fraud can easily copy the electronic information on a merchant's NFC tag device and create a duplicate copy of the tag. Using the duplicate NFC tag device, such user may then continue to conduct fraudulent "check-ins" of the merchant's facility without actually being at the merchant's facility. By engaging in such fraudulent transactions, said user may quickly accrue check-in points and earn merchant rewards that he does not deserve. These types of security problems undermine the faith and perception of the public (both the merchant and other honest users) toward the "check-in" system and consequently may prevent its growth.

According to the various aspects of the present disclosure, an enhanced NFC-enabled check-in method and apparatus is discussed, which can quickly discover fraudulent check-ins and provide appropriate remedies. One aspect of the present disclosure involves cryptographic signatures, which is away to verify whether or not a document has been tampered with during transit.

Figure 2:
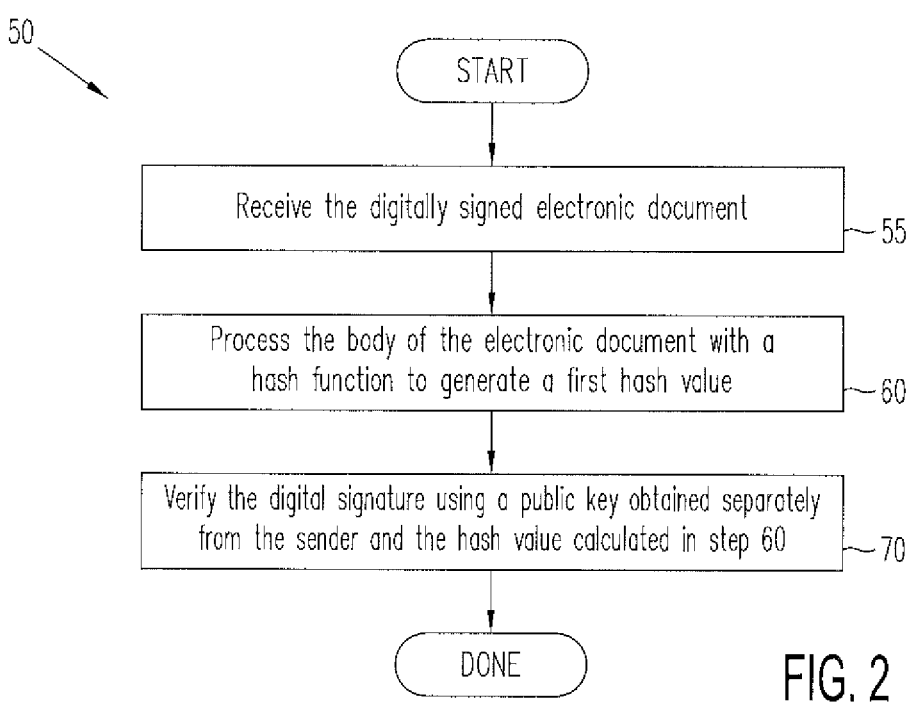

FIGS. 1 and 2 and the corresponding discussions below illustrate an example of cryptographic signatures. Referring to FIG. 1, a flowchart of a method 20 of a cryptographic signing is shown. The method 20 includes a step 25 in which an electronic document is provided. The electronic document may be any type of electronic file that can be read by a computer, for example an E-mail.

The method proceeds to a step 30 in which the electronic document is processed with a hash function to generate a hash value. A hash function is a mathematical procedure that receives a block of data as an input and returns a fixed-size value as an output. The input data here is the electronic document. The output of the hash function is referred to as the hash value. Regardless of the size of the input data, the size of the output hash value remains the same. However, a change in the input data itself, even if minor, will cause a significant change of the output hash value. This property of the hash function is useful, as it can be employed to monitor the integrity of electronic documents in transit.

The method 20 proceeds to a step 35 in which a cryptographic signature of the hash value is generated with a private key. In more detail, a key generation algorithm may be used to generate a pair of cryptographic keys: a private key and a public key. In some embodiments, the private key and the public key are the only two factors of a large prime number. The sender of an electronic document keeps the private key to himself, but he can freely distribute the public key to other entities, for example to the intended recipients of his electronic documents. The hash value generated in the step 30 is encrypted by such a private key, the result of which is the cryptographic signature.

The method 20 then proceeds to a step 40 in which the cryptographic signature is appended to the electronic document. A digital certificate may be used to append the cryptographic signature to the electronic document. The digital certificate may be issued by a certificate authority and may contain the public key and a variety of other identification information. Once the cryptographic signature is appended to the electronic document, a digitally signed electronic document is ready for transmission.

Referring now to FIG. 2, a flowchart of a method 50 of a cryptographic verification is shown. The method 50 includes a step 55 in which the digitally signed electronic document is received by a recipient. The digitally signed electronic document may be separated into a body portion (which is the document itself) and a digital signature portion. The method 50 proceeds to a step 60 in which the body portion of the electronic document is processed by the same hash function used in the step 30 of the method 20. This produces a first hash value.

The method 50 proceeds to a step 70 in which the digital signature is verified using a public key obtained separately from the sender and the hash value calculated in step 60. If the electronic document has not been tampered with during transit, the first hash value and the second hash value should be identical. On the other hand, if the electronic document has been tampered with, even if the change was very minor, the first hash value will be significantly different from the second value. In this manner, the recipient of the electronic document can determine whether the sender's electronic document has been securely transmitted.

Figure 3:
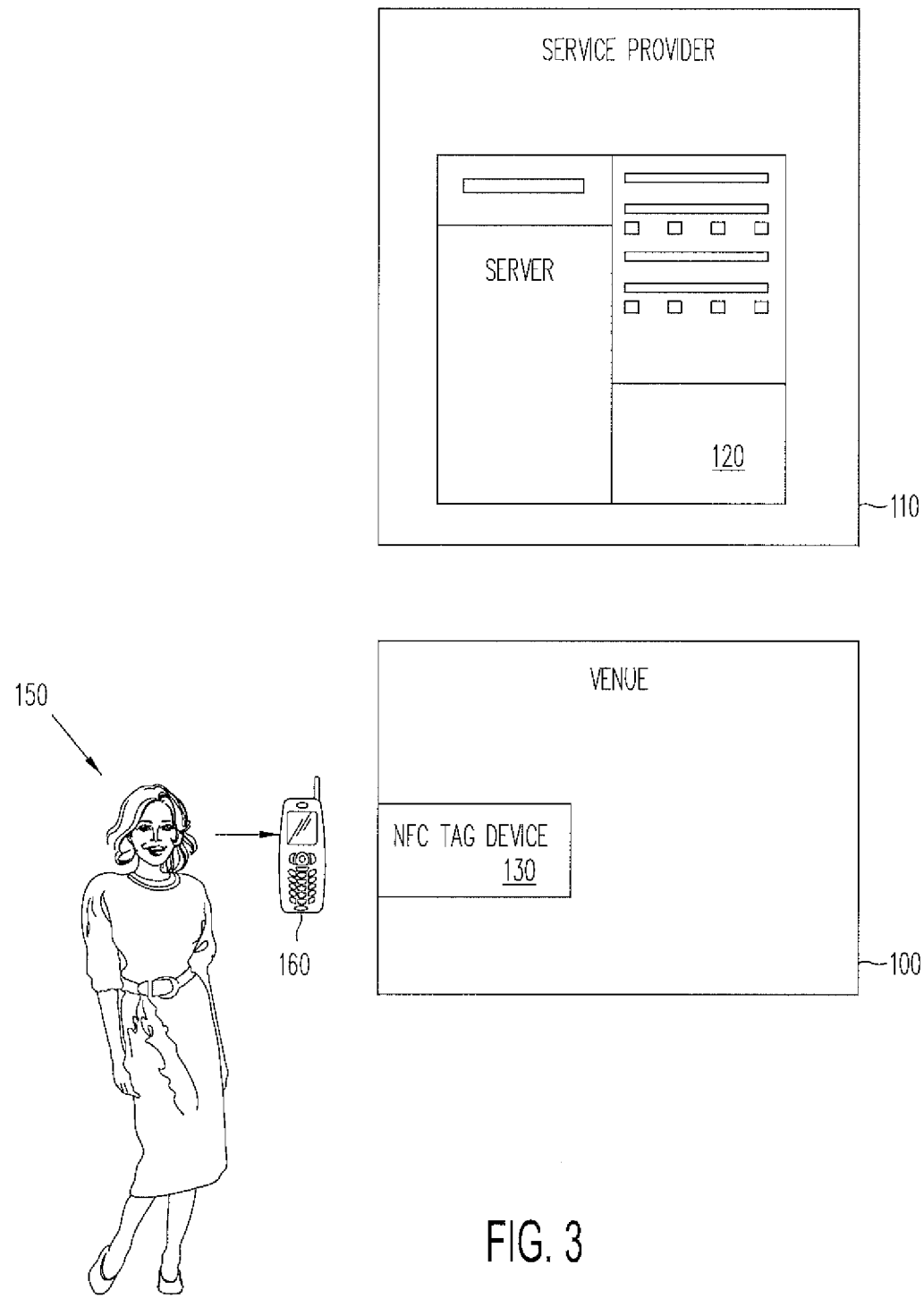
FIG. 3 illustrates an example block diagram for performing check-ins according to various aspects of the present disclosure.

FIG. 3 is a block diagram of an example system for verifying the integrity of user check-ins according to various aspects of the present disclosure. Referring to FIG. 3, a block diagram of a venue 100 is illustrated. The venue 100 may be privately owned by a merchant, such as a store, a restaurant, a bar, an entertainment facility, etc. The venue 100 may also be publicly owned, such as a library, a park, a government building, a school, etc. For ease of reference, an operator or owner of the venue 100 may thereafter be referred to as the venue 100.

To increase the popularity or visitor traffic of the venue 100, the venue 100 may participate in a check-in scheme discussed above, for example in a social media context. In other words, the venue 100 will allow its visitors to announce their check-ins at the venue through a social media channel. The venue 100 will keep track of the number of visits by each visitor, and the venue 100 may also give rewards to frequent visitors who meet or exceed a predetermined number of check-ins.

To prevent fraud in the check-in process, the venue 100 subscribes to a check-in monitoring service offered by a service provider 110. The service provider 110 may be a third party payment provider (e.g., PAYPAL, INC®. of San Jose, Calif.), or another suitable entity. The service provider 110 has a computer server 120 that is configured to electronically communicate with external devices as well as process electronic information. In some embodiments, the server 120 provides and/or runs a check-in application software (or "app").

The venue 100 installs the check-in app on one of its computers. The check-in app generates a public/private key pair. The private key remains local (i.e., known only to the venue 100). The public key is electronically sent to the server 120 of the service provider 110, which stores it therein and associates the public key with the venue 100's account. The venue 100 also installs an NFC tag device 130 inside its facility. For example, if the venue is a restaurant, the NFC tag device 130 may be installed on a wall by the entrance. The NFC tag device 130 may be a read-write tag device. The NFC tag device 130 is operable to establish radio communication with other NFC device in close proximity, for example within a few centimeters.

The check-in app downloaded by the venue 100 is used to initialize the NFC tag device 130. In an embodiment, the check-in app contacts the server 120, which generates a seed value based on information that the venue 100 provided to the service provider 110. For example, the information provided to the service provider may include information about the venue 100 such as its name, location (e.g., GPS coordinates), web-site address, etc. The seed value is generated in response to this information and is then digitally signed by the server 120. The check-in app has a certificate that allows it to verify that the seed value came directly from the server 120. The seed value with the server's signature is then signed with the venue's private key. At this point, a check-in seed for a check-in chain (to be discussed below) is formed. The check-in seed contains the seed value (generated by the server 120), the seed signature from the server 120, and the signature from the venue 100.

Suppose a user 150 is visiting the venue 100. To facilitate the ensuing discussions, the user 150 is referred to as user A. The user A may also be a subscriber to the check-in service discussed above and may have his own private and public key pair. The public key of the user A, as well as user A's account information, are electronically stored on the server 120. The user A also has an NFC-enabled mobile communications device 160, such as a smart phone or a computer tablet. The user A may be prompted to check in to the venue by tagging the NFC-enabled mobile communications device 160 with the NFC tag device 130, or otherwise bringing the devices 130 and 160 in close proximity.

The tagging of the devices 130 and 160 allows the mobile communications device 160 to read the existing check-in chain entry, which only contains the check-in seed at this point. The check-in app (downloaded to the mobile communications device 160) generates a unique user identification (ID), which may contain a 128 bit number in some embodiments. The check-in app of the user also generates other relevant information, such as a timestamp corresponding to the time of the tagging. The unique user ID and the other relevant information may collectively be referred to as information of the user A.

A new check-in chain (or tag) is then generated and written back to the NFC tag device 130. The new check-in chain is generated as a function of the previous check-in chain and the user A's information. In an embodiment, the new check-in contains: the check-in seed+the information of the user A+the user A's digital signature of (the check-in seed+the user A's information). In other words, both the check-in seed and the user A's information—which includes the unique user ID—are collectively signed with the user's private key to generate the user A's digital signature. To simplify the following discussions, the combination of the user A's information+the user A's digital signature of (the check-in seed+ information of the user A) is replaced by the shorthand notation of "A", and the check-in seed is replaced by the shorthand notation of "S". Therefore, at this point, the new check-in chain looks like: S->A.

The new check-in chain (or new tag) is uploaded to the server 120, which informs the server 120 that user A has apparently checked into the venue 100. The server 120 then verifies the new check-in chain using the public key associated with the user A's account and the public key of the venue 100. Specifically, the server 120 uses the public key of the user A to verify the user A's account, and after that, the server 120 uses the public key of the server 120 to verify the check-in seed. If verification is successful, the server 120 will record the new check-in chain and give credit for the check-in to the user A. The server 120 also links the unique user ID to the user A's account.

Now suppose another user B visits the venue 100 after the user A. The user B is also a subscriber of the check-in services provided by the venue 100 and the service provider 110. Similar to the user A, the user B also has an NFC-enabled communications device, which he uses to tag the NFC tag device 130 at the venue 100 to notify the server 120 of his check-in. The tagging generates a new check-in chain in the similar manner as described above with reference to user A. But now, the existing chain seen by user B's NFC-enabled communications device contains not only the check-in seed, but also the user A's information as well as the user A's digital signature. Thus, the user B's digital signature is generated as a function of the user A's information and the user A's digital signature as well. In other words, the user B's digital signature is dependent on the previous signature on the check-in chain—the user A's digital signature.

After the server 120 verifies the user B's check-in (using the user B's public key), the server 120 also goes up the chain and verifies that the user A's check-in that is reported by user B has not been tampered with either, which can be done by using the user A's public key. At some point, the server 120 writes the new check-in chain into the NFC tag device 130. This may be performed asynchronously to the verification through the entire check-in chain. For example, the client (user) may write the new appended chain immediately, and later send the value to the server for verification. The client need not wait for the server to respond. The new check-in chain at this point may be expressed with the shorthand notation of S->A->B.

Suppose that users C and D also check in after user B. The same procedure discussed above is applied for these users' check-ins as well. Each time, the signature of the user who is at the end of the chain is generated as a function of all the previous signatures on the chain. Meanwhile, if nothing has been tampered with, the check-in seed remains the same, as do all previous check-ins and their corresponding signatures. Thus, as each new user is checking in, he is effectively reporting back to the server that he is appending his signature to the end of the chain, and what the chain looks like from his perspective at the time of his check-in. He is asserting— through encryption with his private key—this to be true and nothing has been tampered with. The server 120 is the only entity who can verify each user's report, because the server 120 has the public key for each user. Through decryption with the public keys, the server 120 can verify the signature of the last user on the chain, and then the signature of the previous user, so on and so forth, until the whole chain has been verified. As an analogy, it is similar to peeling the layers of an onion one at a time. This ensures the integrity of the entire chain reported by each user. After users C and D have successfully checked in, the check-in chain can be expressed with the shorthand notation of S->A->B->C->D.

Now suppose a nefariously minded user E is scheming to commit fraudulent check-ins. The user E may go to the venue 100 and read the check-in chain on the NFC tag device 130 at that time. He can make a copy of the chain on a duplicate NFC device. Thereafter he goes home and tries to check in continuously. His initial attempt may be successful, since from the server's perspective, the check-in chain now looks like S->A->B->C->D->E. The user E may very well be checking in at the venue 100.

Meanwhile, another user F may perform a legitimate check-in at the venue 100. The server 120 will now receive a check-in chain that looks like S->A->B->C->D->F. In other words, there is now a split in the chain: one from D to E, and the other one from D to F. The server 120 will know that fraud has been committed, but it will not immediately know which user is the one committing the fraud. However, as more and more legitimate users check in after F, for example users G and H, the true branch of the check-in chain will look like S->A->B->C->D->F->G->H, whereas the fraudulent branch of the check-in chain for example may look like S->A-> B->C->D->E->E->E. It will therefore become clear to the server 120 that user E was lying. The busier the venue 100 (i.e., the more user traffic it has), the more quickly the server 120 can detect the fraudulent check-in, since the true chain will be updated more quickly, whereas the fraudulent chain will be updated much more slowly and in many cases updated by only the fraudulent user. The fraudulent user may even try to delay the inevitable detection of his fraudulent activities by having his friends and family perform check-ins to his duplicate NFC device. But their combined check-in volume will like still be far less than the true check-in volume at the venue 100, and thus sooner or later their fraud will be exposed.

After the server 120 determines who the fraudulent user is, it may undertake any (or all) of the actions to punish the fraudulent user: delete the fraudulent chain; rescind any credit given to the user's fraudulent check-ins; apprise the venue 100 of the user's fraudulent activities so that the venue may take further actions against the user as necessary; and make announcements on a social media network regarding the user's fraudulent activities.

The check-in chain discussed above may also need to be reset once in a while, since the NFC tag device 130 does not have an infinite storage capacity. For example, suppose the NFC tag device 130 can only store 1000 check-in entries. Thus, as the $1000^{th}$ user checks in to the venue 100, the server 120 may send a message via the check-in app to the user. The message informs the user that he is the $1000^{th}$ person to check in to the venue 100, and that he needs to perform the tagging again to confirm his status. Meanwhile, the check-in app has requested a new seed from the server 120. With the second tagging by the user, the check-in chain is now reset with the new seed, which may contain the last few check-ins to ensure continuity. Thus, the check-in process discussed above may be repeated continuously. The venue 100 no longer needs to be concerned about giving rewards to fraudulent users since the server 120 can quickly identify the perpetrators.

Figure 4:
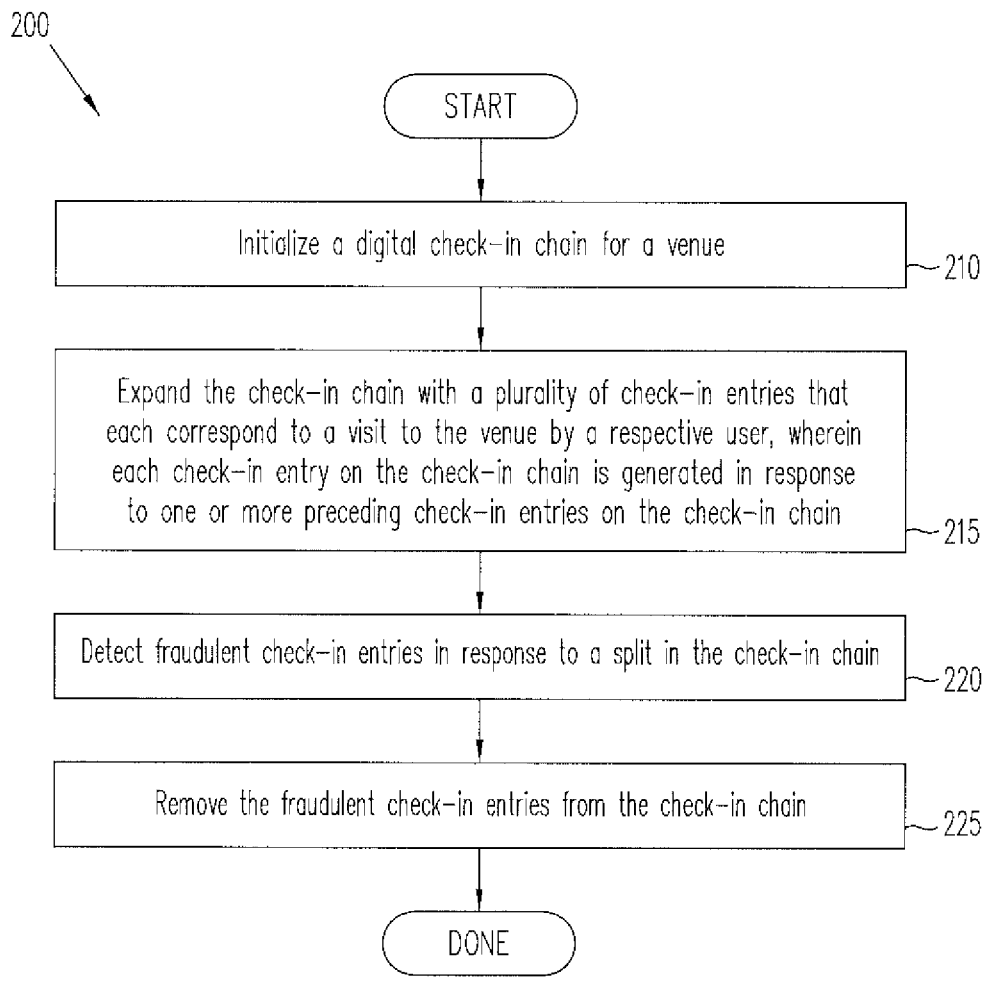
FIGS. 4-5 illustrate flowcharts containing process flows for verifying check-ins according to various aspects of the present disclosure.

FIG. 4 is a flowchart of a method 200 of verifying a user check-in. The method 200 includes a step 210 in which a digital check-in chain is initialized for a venue. The venue may include a store, a restaurant, a bar, a government building, a library, a park, etc. In some embodiments, the check-in chain is initialized by generating a check-in seed that contains information about the venue.

The method 200 includes a step 215 in which the check-in chain is expanded with a plurality of check-in entries that each correspond to a visit to the venue by a respective user. Each check-in entry on the check-in chain is generated in response to one or more preceding check-in entries on the check-in chain. The check-in chain is expanded electronically by a processor. In some embodiments, each check-in entry contains a cryptographic signature of its corresponding user. In some embodiments, each cryptographic signature is generated as a function of every other existing cryptographic signature on the check-in chain. In some embodiments, each check-in entry further contains a unique user identification. In some embodiments, the step 215 further contains the following steps: receiving a check-in request from a user, the check-in request containing information that is encrypted with a private key associated with the user; and validating the check-in request using a public key associated with the user. In some embodiments, at least some of the check-in entries correspond to visits to the venue by the same user. In some embodiments, each check-in entry is generated using NFC technology.

The method 200 includes a step 220 in which fraudulent check-in entries are detected in response to a split in the check-in chain. In some embodiments, the step 220 further includes the following steps: receiving multiple check-in requests corresponding to different users, wherein all the check-in requests depend from the same previous check-in entry on the check-in chain, thereby splitting the check-in chain into multiple branches; monitoring subsequent check-in activities for each branch; and determining which branch is fraudulent based on the subsequent check-in activities.

The method 200 includes a step 225 in which the fraudulent check-in entries are removed from the check-in chain. It is understood that the method 200 may include additional steps that may be performed before, during, or after the steps 210-225. For example, after the fraudulent check-in entries are removed from the check-in chain, additional punishment may be levied against the users committing the fraud, such as canceling the user's account, rescinding all the check-in credits given to the user, etc.

Figure 5:
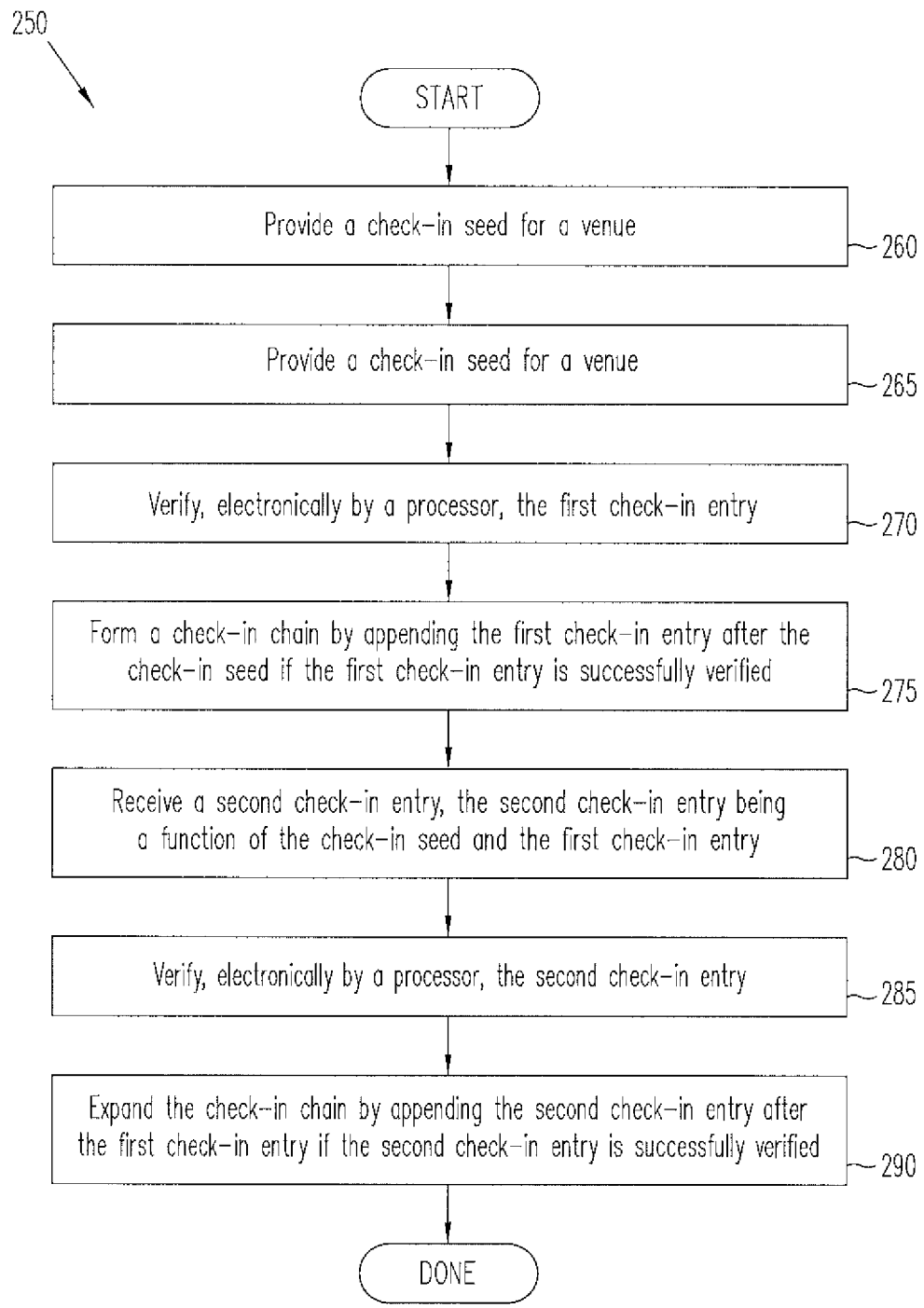

FIG. 5 is a flowchart of a method 250 of verifying a user check-in. The method 250 includes a step 260 in which a check-in seed is provided for a venue. The method 250 includes a step 265 in which a first check-in entry is received, the first check-in entry being a function of the check-in seed. In some embodiments, the first check-in entry contains a first cryptographic signature. The first cryptographic signature is encrypted with a first private key. The method 250 includes a step 270 in which the first check-in entry is verified electronically by a computer processor. In some embodiments, the first check-in entry is verified by decrypting the first cryptographic signature. The method 250 includes a step 275 in which a check-in chain is formed by appending the first check-in entry after the check-in seed if the first check-in entry is successfully verified.

The method 250 includes a step 280 in which a second check-in entry is received, the second check-in entry being a function of the check-in seed and the first check-in entry. In some embodiments, the second check-in entry contains a second cryptographic signature. The second cryptographic signature is encrypted with a second private key. The method 250 includes a step 285 in which the second check-in entry is verified electronically by a computer processor. In some embodiments, the second check-in entry is verified by decrypting the second cryptographic signature.

The method 250 includes a step 290 in which the check-in chain is expanded by appending the second check-in entry after the first check-in entry if the second check-in entry is successfully verified. In some embodiments, the first check-in entry and the second check-in entry are each generated using a device equipped with NFC technology. It is understood that the method 250 may include additional steps that may be performed before, during, or after the steps 260-290. For example, the method 250 may further include a step in which the chain is continuously expanded by verifying additional check-in entries and appending the additional check-in entries to the check-in chain, wherein each check-in entry on the check-in chain is dependent on previous check-in entries on the check-in chain. As another example, the method 250 may further include a step in which fraudulent check-ins are identified by detecting a break in the check-in chain. As yet another example, the method 250 may further include a step in which the check-in chain is reset after the check-in chain has reached a predetermined number of check-in entries.

Figure 6:
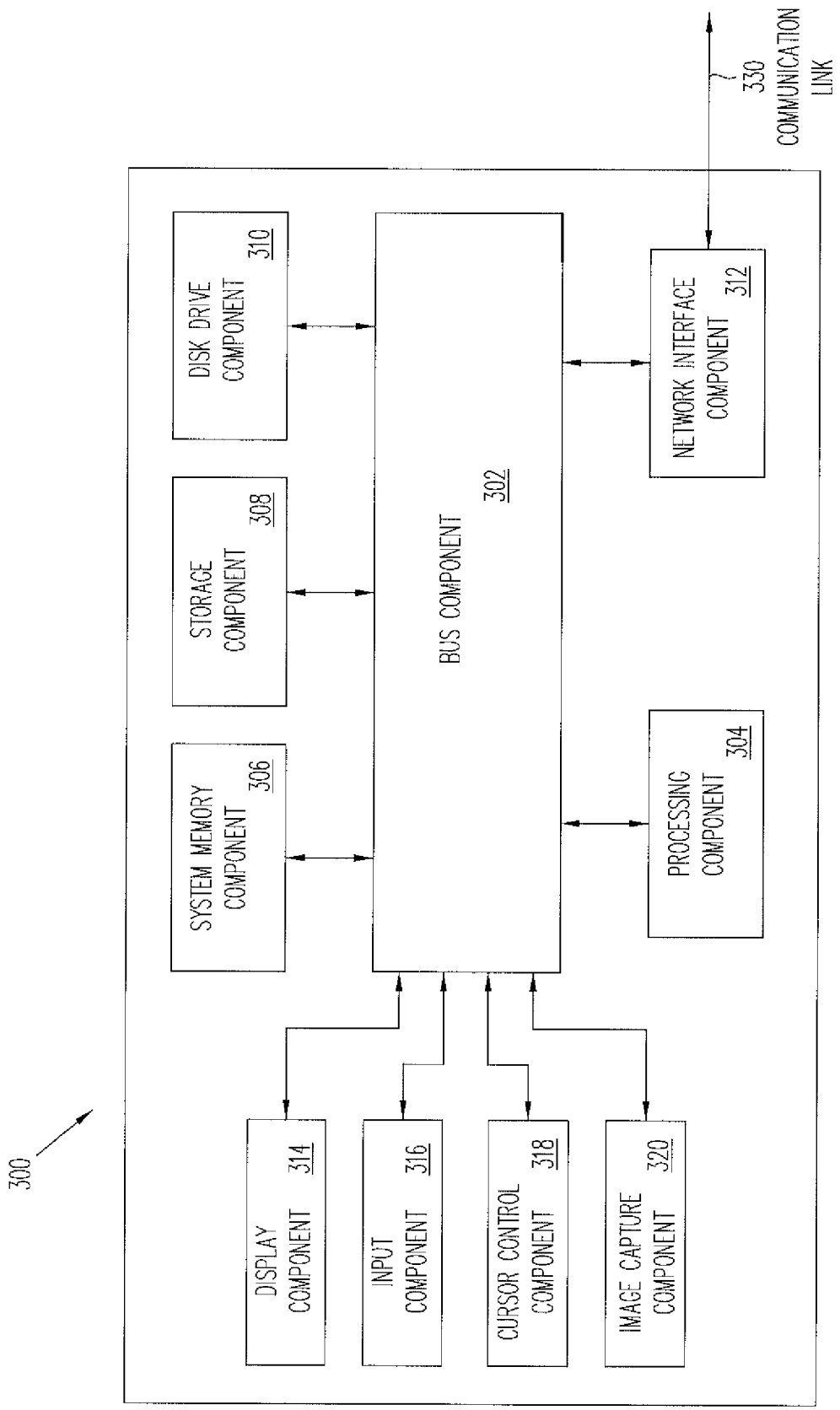
FIG. 6 illustrates a block diagram of a computer system for implementing various methods and devices described according to various aspects of the present disclosure.

FIG. 6 is a block diagram of a computer system 300 suitable for implementing various methods and devices described herein, for example, the various method steps of the method 200 or the method 250. In various implementations, the devices capable of performing the steps (for example, the server 120) may comprise a network communications device (e.g., mobile cellular phone, laptop, personal computer, tablet, etc.), a network computing device (e.g., a network server, a computer processor, an electronic communications interface, etc), or another suitable device. Accordingly, it should be appreciated that the devices capable of implementing the methods 200 and 250 may be implemented as the computer system 300 in a manner as follows.

In accordance with various embodiments of the present disclosure, the computer system 300, such as a mobile communications device and/or a network server, includes a bus component 302 or other communication mechanisms for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., cathode ray tube (CRT) or liquid crystal display (LCD)), input component 316 (e.g., keyboard), cursor control component 318 (e.g., mouse or trackball), and image capture component 320 (e.g., analog or digital camera). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of (or in combination with) software instructions to implement the present disclosure.

Logic may be encoded in a computer readable medium, which may refer to any medium that participates in providing instructions to processor 304 for execution. Such a medium may take many forms, including but not limited to, non-volatile media and volatile media. In one embodiment, the computer readable medium is non-transitory. In various implementations, non-volatile media includes optical or magnetic disks, such as disk drive component 310, and volatile media includes dynamic memory, such as system memory component 306. In one aspect, data and information related to execution instructions may be transmitted to computer system 300 via a transmission media, such as in the form of acoustic or light waves, including those generated during radio wave and infrared data communications. In various implementations, transmission media may include coaxial cables, copper wire, and fiber optics, including wires that comprise bus 302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 330 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    initializing a digital check-in chain for a venue;
    expanding, electronically by a processor, the check-in chain with a plurality of check-in entries that each correspond to a visit to the venue by a respective user, wherein each check-in entry on the check-in chain is generated in response to one or more preceding check-in entries on the check-in chain;
    detecting fraudulent check-in entries in response to a split in the check-in chain; and
    removing the fraudulent check-in entries from the check-in chain.

2. The method of claim 1, wherein the initializing the digital check-in chain comprises generating a check-in seed that contains information about the venue.

3. The method of claim 1, wherein each check-in entry contains a cryptographic signature of its corresponding user.

4. The method of claim 3, wherein each cryptographic signature is generated as a function of every other existing cryptographic signature on the check-in chain.

5. The method of claim 3, wherein each check-in entry further contains a unique user identification.

6. The method of claim 1, wherein the expanding the check-in chain comprises:
    receiving a check-in request from a user, the check-in request containing information that is signed with a private key associated with the user; and
    validating the check-in request using a public key associated with the user.

7. The method of claim 1, wherein at least some of the check-in entries correspond to visits to the venue by the same user.

8. The method of claim 1, wherein the detecting fraudulent check-in entries comprises:
    receiving multiple check-in requests corresponding to different users, wherein all the check-in requests depend from the same previous check-in entry on the check-in chain, thereby splitting the check-in chain into multiple branches;
    monitoring subsequent check-in activities for each branch; and
    determining which branch is fraudulent based on the subsequent check-in activities.

9. The method of claim 1, wherein each check-in entry is generated using a Near Field Communication (NFC) technology.

10. An apparatus comprising a non-transitory, tangible computer readable storage medium storing a computer program, wherein the computer program contains instructions that when executed, perform:
    initializing a digital check-in chain for a venue;
    expanding, electronically by a processor, the check-in chain with a plurality of check-in entries that each correspond to a visit to the venue by a respective user, wherein each check-in entry on the check-in chain is generated in response to one or more preceding check-in entries on the check-in chain;
    detecting fraudulent check-in entries in response to a split in the check-in chain; and
    removing the fraudulent check-in entries from the check-in chain.

11. The apparatus of claim 10, wherein the instructions for initializing the digital check-in chain comprise instructions for generating a check-in seed that contains information about the venue.

12. The apparatus of claim 10, wherein each check-in entry contains a cryptographic signature of its corresponding user.

13. The apparatus of claim 12, wherein each cryptographic signature is generated as a function of every other existing cryptographic signature on the check-in chain.

14. The apparatus of claim 12, wherein each check-in entry further contains a unique user identification.

15. The apparatus of claim 10, wherein the instructions for expanding the check-in chain comprise instructions for:
    receiving a check-in request from a user, the check-in request containing information that is signed with a private key associated with the user; and
    validating the check-in request using a public key associated with the user.

16. The apparatus of claim 10, wherein at least some of the check-in entries correspond to visits to the venue by the same user.

17. The apparatus of claim 10, wherein the instructions for detecting fraudulent check-in entries comprise instructions for:
    receiving multiple check-in requests corresponding to different users, wherein all the check-in requests depend from the same previous check-in entry on the check-in chain, thereby splitting the check-in chain into multiple branches;
    monitoring subsequent check-in activities for each branch; and
    determining which branch is fraudulent based on the subsequent check-in activities.

18. The apparatus of claim 10, wherein each check-in entry is generated using a Near Field Communication (NFC) technology.

19. A method, comprising:
    providing a check-in seed for a venue;
    receiving a first check-in entry, the first check-in entry being a function of the check-in seed;
    verifying, electronically by a processor, the first check-in entry;
    forming a check-in chain by appending the first check-in entry after the check-in seed if the first check-in entry is successfully verified;
    receiving a second check-in entry, the second check-in entry being a function of the check-in seed and the first check-in entry;
    verifying, electronically by the processor, the second check-in entry; and
    expanding the check-in chain by appending the second check-in entry after the first check-in entry if the second check-in entry is successfully verified.

20. The method of claim 19, wherein:
    the first check-in entry and the second check-in entry contain a first cryptographic signature and a second cryptographic signature, respectively; and
    the verifying the first check-in entry and the verifying the second check-in entry are performed by verifying the first cryptographic signature and verifying the second cryptographic signature, respectively.

21. The method of claim 20, wherein the first cryptographic signature and the second cryptographic signature are generated with a first private key and a second private key, respectively.

22. The method of claim 20, wherein the verifying the first check-in entry and the verifying the second check-in entry are performed at least in part by verifying the first cryptographic signature with a first public key and verifying the second cryptographic signature with a second public key, respectively.

23. The method of claim 19, further comprising: continuously expanding the chain by verifying additional check-in entries and appending the additional check-in entries to the check-in chain, wherein each check-in entry on the check-in chain is dependent on previous check-in entries on the check-in chain.

24. The method of claim 23, further comprising: identifying fraudulent check-ins by detecting a break in the check-in chain.

25. The method of claim 23, further comprising: resetting the check-in chain after the check-in chain has reached a predetermined number of check-in entries.

26. The method of claim 19, wherein the first check-in entry and the second check-in entry are each generated using a device equipped with a Near Field Communications (NFC) technology.

* * * * *